United States Patent
Yi et al.

(10) Patent No.: US 10,505,735 B2
(45) Date of Patent: Dec. 10, 2019

(54) DIGITAL CONTENT PROTECTION OVER AUDIO RETURN DATA LINK

(71) Applicant: Lattice Semiconductor Corporation, Portland, OR (US)

(72) Inventors: Ju Hwan Yi, Sunnyvale, CA (US); Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 68 days.

(21) Appl. No.: 15/528,059

(22) PCT Filed: Dec. 7, 2015

(86) PCT No.: PCT/US2015/064322
§ 371 (c)(1),
(2) Date: May 18, 2017

(87) PCT Pub. No.: WO2016/094319
PCT Pub. Date: Jun. 16, 2016

(65) Prior Publication Data
US 2017/0317829 A1  Nov. 2, 2017

Related U.S. Application Data

(60) Provisional application No. 62/089,767, filed on Dec. 9, 2014.

(51) Int. Cl.
*H04L 29/06* (2006.01)
*H04L 9/32* (2006.01)
(Continued)

(52) U.S. Cl.
CPC .......... *H04L 9/3226* (2013.01); *G06F 21/602* (2013.01); *H04L 9/0891* (2013.01);
(Continued)

(58) Field of Classification Search
CPC ... H04L 9/3226; H04L 9/0891; H04L 9/0894; H04L 63/0428; H04L 63/068; G06F 21/602
(Continued)

(56) References Cited

U.S. PATENT DOCUMENTS 9,575,917 B1 * 2/2017 Zhu .................. G06F 13/385
2002/0154775 A1 10/2002 Yang
(Continued)

FOREIGN PATENT DOCUMENTS

CN  101686360 A  3/2010
CN  102917250 A  2/2013
(Continued)

OTHER PUBLICATIONS

"High-Bandwidth Digital Content Protection System, Mapping HDCP to HDMI," Revision 2.2, Digital Content Protection LLC, © 1999-2012 Intel Corporation, Feb. 13, 2013, 72 pages.
(Continued)

*Primary Examiner* — Evans Desrosiers
(74) *Attorney, Agent, or Firm* — Fenwick & West LLP (57) ABSTRACT

Embodiments relate to inserting a preamble code as a preamble of a sub-frame of encrypted data to indicate rekeying is to be performed at a source device and to indicate data of the sub-frame and subsequent sub-frames is encrypted. A sink device authenticates a source device using an authentication and encryption protocol. The sink device receives a data stream including audio data. At least a portion of the received audio data is encrypted and the encrypted audio data is packetized into sub-frames. The sink device inserts a first preamble code as a preamble of a sub-frame to indicate rekeying is to be performed at the source device according to the authentication and encryption protocol, and to indicate that the audio data in a payload of the sub-frame and payloads of subsequent sub-frames is encrypted. The sink device transmits the packet to the source device via a first data link.

21 Claims, 8 Drawing Sheets

(51) Int. Cl.
*G06F 21/60* (2013.01)
*H04L 9/08* (2006.01)

(52) U.S. Cl.
CPC ........ *H04L 9/0894* (2013.01); *H04L 63/0428* (2013.01); *H04L 63/068* (2013.01)

(58) Field of Classification Search
USPC .......................................................... 713/189
See application file for complete search history.

(56) References Cited

U.S. PATENT DOCUMENTS

| | | | | |
|---|---|---|---|---|
| 2003/0167397 A1* | 9/2003 | Mangold | .............. | H04N 7/1675 713/189 |
| 2012/0023331 A1* | 1/2012 | Altmann | .......... | H04N 21/43635 713/168 |
| 2013/0205331 A1* | 8/2013 | Ducharme | ....... | H04N 21/23476 725/31 |
| 2014/0325213 A1 | 10/2014 | Carlson et al. | | |

FOREIGN PATENT DOCUMENTS

| | | |
|---|---|---|
| CN | 103026728 A | 4/2013 |
| EP | 1519581 A1 | 3/2005 |

OTHER PUBLICATIONS

PCT International Search Report and Written Opinion, PCT/US2015/064322, dated Apr. 1, 2016, 9 pgs.
China National Intellectual Property Administration, The First Office Action, CN Patent Application No. 201580074224.X, dated Oct. 8, 2019, 36 pages.

\* cited by examiner

DIGITAL CONTENT PROTECTION OVER AUDIO RETURN DATA LINK

CROSS REFERENCE TO RELATED APPLICATIONS

This application claims the benefit of U.S. Provisional Application No. 62/089,767 filed on Dec. 9, 2014, which is incorporated by reference in its entirety.

BACKGROUND

1. Field of the Disclosure

This disclosure pertains in general to data communications, and more specifically to transmitting rekeying information from a sink device to a source device over a return data link.

2. Description of the Related Art

High-bandwidth Digital Content Protection ("HDCP") is a specification designed to protect digital content across various interfaces. A typical HDCP configuration includes an HDCP source device (i.e., DVD) player, HD DVD player, Blu-Ray player, computer video cards, etc.), an HDCP sink device (i.e., receiver, television, monitor, etc.), and an audio device (e.g., surround sound system). The HDCP source device authenticates with the HDCP sink device using an HDCP authentication and encryption protocol referred to as the HDCP protocol. The HDCP source device encrypts a data stream including video data using the HDCP protocol, and transmits the encrypted data stream to the HDCP sink device. That is, the data transmitted from the HDCP source device to the HDCP sink device is encrypted.

In a commonly used configuration, an HDCP source device transmits video data to an HDCP sink device while sending corresponding audio data to an audio device separate from the HDCP source device and the HDCP sink device. The audio device produces sound based on the audio data while the HDCP sink device or a display device connected to the HDCP sink device produces images based on the video data.

In a different configuration, an HDCP sink device receives a data stream including video data and audio data from an external source (e.g., over-the-air antenna), and transmits the received audio data to an audio device via the HDCP source device. A link between the HDCP sink device and the HDCP source device is referred to as Audio Return Channel ("ARC"). When using the ARC, the HDCP sink device does not authenticate the HDCP source device nor does the HDCP sink device encrypt the audio data before transmitting the audio data to the audio device via the HDCP source device. Hence, high-quality audio data transmitted over the ARC is not protected and is vulnerable to illegal copying.

SUMMARY

Embodiments relate to inserting a preamble code as a preamble of a sub-frame of encrypted data to indicate performing of rekeying at a source device and to indicate data of the sub-frame and subsequent sub-frames is encrypted. A sink device authenticates a source device using an authentication and encryption protocol. The sink device receives a data stream including audio data. At least a portion of the received audio data is encrypted and the encrypted audio data including the at least the portion is packetized into sub-frames. The sink device modifies the sub-frames by inserting a first preamble code as a preamble of a sub-frame to indicate performing of rekeying at the source device according to the authentication and encryption protocol, and to indicate that at least the portion of the audio data in a payload of the sub-frame and payloads of a plurality of subsequent sub-frames is encrypted. The sink device transmits the modified sub-frames to the source device via a first data link.

In one embodiment, the audio data includes units of audio blocks, each audio block including 192 frames, each frame including 2 sub-frames, and each sub-frame including at least a preamble and an audio sample word. The preamble includes one of: the first preamble code, a second preamble code indicating a start of an audio block and that an audio sample word corresponds to a first channel is to follow, a third preamble code indicating that an audio sample word corresponding to the first channel is to follow, and a fourth preamble code indicating that an audio sample word corresponding to a second channel is to follow. The first preamble code further indicates a start of an audio block and that an audio sample word corresponding to the first channel is to follow.

In one embodiment, inserting the first preamble code as the preamble of the sub-frame includes replacing a second preamble code of the preamble of the sub-frame with the first preamble code.

In one embodiment, the sink device determines whether the portion of the audio data is to be encrypted.

In one embodiment, the first data link is an Audio Return Channel ("ARC"). In this embodiment, authenticating the source device by the sink device is preformed via the first data link.

In one embodiment, authenticating the source device by the sink device is preformed via the first data link and a second data link separate from the first data link. The second data link can be a Display Data Channel ("DDC").

In one embodiment, the authentication and encryption protocol is High-bandwidth Digital Content Protection ("HDCP") protocol.

Embodiments also relate to a sink device including a receiver, an encryption circuit, and a transmitter. The receiver receives a data stream including audio data. The encryption circuit is coupled to the receiver. The encryption circuit includes a processor and a memory to authenticate a source device using an authentication and encryption protocol, encrypt the received audio data, packetize the encrypted audio data into sub-frames, and modify the sub-frames by a first preamble code as a preamble of a sub-frame. The first preamble code indicates that rekeying is to be performed the source device according to the authentication and encryption protocol. The first preamble code further indicating that the audio data in a payload of the sub-frame and payloads of a plurality of subsequent sub-frames is encrypted. The transmitter is coupled to the encryption circuit, and transmits the modified sub-frames to the source device via a first data link.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It is noted that wherever practicable similar or like reference numbers may be used in the figures may indicate similar or like functionality. Alternative embodiments of the structures and methods disclosed herein will be readily recognized as viable alternatives that may be employed without departing from the principles discussed herein. Reference will now be made in detail to several embodiments, examples of which are illustrated in the accompanying figures.

Embodiments relate to inserting preambles for digital audio data transmitted from a sink device to a source device through a return data link (e.g., Audio Return Channel ("ARC")) to indicate whether certain portions of audio data are encrypted. The sink device inserts a first preamble code as a preamble of a sub-frame of audio data at certain locations to indicate that rekeying is to be performed at the source device according to the authentication and encryption protocol, and to indicate that a portion of the audio data sent from the sink device to the source device over the return data link is encrypted. The sink device inserts a second preamble code as a preamble of a sub-frame at the certain locations if the portion of the audio data transmitted over the return data link is not encrypted.

System Overview

The following embodiments are described primarily using High-bandwidth Digital Content Protection ("HDCP") in the context of High-Definition Multimedia Interface ("HDMI") as an example. However, authentication and encryption protocols/schemes other than HDCP and media transmission protocols/schemes other than HDMI can also use the principles of the disclosure described herein.

The HDCP protocol is an exchange between a transmitter and a receiver that affirms to the transmitter that the receiver is authorized to receive encrypted content. The transmitter authenticates the receiver using the HDCP protocol. After authentication, the transmitter encrypts data using the HDCP protocol and transmits the encrypted data to the receiver. The receiver can decrypt the received encrypted data using the HDCP protocol. The transmitter periodically instructs the receiver to perform rekeying. Rekeying refers to the process of changing encryption key of an ongoing communication between the transmitter and the receiver. Performing rekeying enables the receiver to continue decrypting the encrypted data received from the transmitter.

Figure 1:
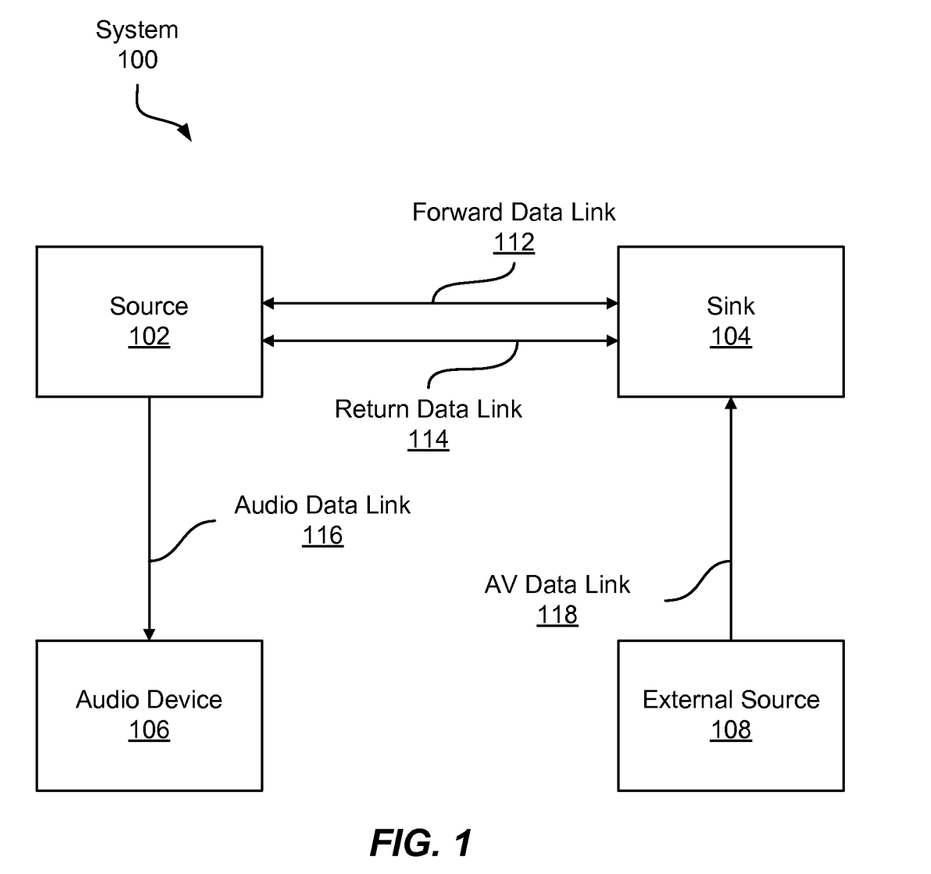
FIG. 1 is a block diagram illustrating a system including a source device, a sink device, an audio device and an external source, according to one embodiment.

FIG. 1 is a block diagram of a system 100 including a source device 102, a sink device 104, an audio device 106, and an external source 108, according to one embodiment. The source device 102 and the sink device 104 are communicatively coupled via a bidirectional forward data link 112 and a bidirectional return data link 114. The source 102 is further communicatively coupled with the audio device 106 via an audio data link 116. The sink device 104 is further communicatively coupled with the external source 108 via an audio/visual (AV) data link 118.

The source device 102 is a device that functions primarily as a source of digital content while the sink device 104 is a device that primarily functions as a consuming device for reproducing the digital content. However, as described herein, the sink device 104 may function as a source of a limited version of digital content such as audio data that can be sent over to the source device 120. Examples of source device 102 include AV receiver, home theater system, DVD players, HD DVD players, Blu-Ray players, and computer video cards. Examples of audio device 106 include surround sound systems.

The source device 102 and the sink device 104 may operate in two different modes: a first mode and a second mode. Although the source device 102 and the sink device 104 mostly operate in one of the two modes, in some cases, the source device 102 and the sink device 104 operate in a hybrid mode where the source device 102 receives audio data from the sink device 104 while the source device 102 transmits audio data/video data to the sink device 104. In the first mode, the source device 102 transmits video data to the sink device 104 over the forward data link 112 and transmits audio data to the audio device 106 over the audio data link 116 while in the second mode the source device 102 routes audio data from the sink device 104 to the audio device 106 over the return data link 114. In the second mode, the sink device 104 transmits audio data to the source device 102 for forwarding to audio device 106. The audio data transmitted in the second mode may be encrypted. When the audio data of the second mode is encrypted, the source device 102 decrypts the encrypted audio data before transmitting the audio data to the audio device 106 over the audio data link 116.

In one embodiment, the sink device 104 routes video data received from the source device 102 in the first mode to a display. In some embodiments, the display is external to the sink device 104, and in other embodiments, the sink device 104 includes the display. In the second mode, the sink device 104 routes audio data from the external source 108 to the source device 102. Examples of sink device 104 include receivers, televisions, and monitors. Examples of external source 108 include over-the-air antennas, set-top boxes, and storage devices.

In one embodiment, the forward data link 112 and the return data link 114 are implemented via a HDMI cable. In this embodiment, the forward data link 112 includes a unidirectional high speed main link (e.g., a Transition-Minimized Differential Signal ("TMDS") link) and a bidirectional slow speed side band link (e.g., Display Data Channel ("DDC") link), and the return data link 114 is an Audio Return Channel ("ARC"). The unidirectional main link transmits data from the source device 102 to the sink device 104. Data transmitted over the return data link 114 is digital data.

In the first mode, the source device 102 authenticates the sink device 104 using the HDCP protocol over the side band link of the forward data link 112. The source device 102 encrypts video data according to the HDCP protocol. Encrypting the video data prevents the video data from being copied or altered while the video data is transmitted from the source device 102 to the sink device 104. The source device 102 transmits the encrypted video data to the sink device 104 over the main link of the forward data link 112. The sink device 104 receives the encrypted video data, decrypts the encrypted video data according to the HDCP protocol and displays the decrypted video data. The source device 102 transmits audio data corresponding to the video data to the audio device 106 over the audio data link 116.

In the second mode, the sink device 104 authenticates the source device 102 over the return data link 114 using the HDCP protocol. The sink device 104 receives an audio/video ("AV") data stream, including audio data, from the external source 108 over the AV data link 118. The sink device 104 encrypts the audio data according to the HDCP protocol and packetizes the encrypted audio data into sub-frames.

The audio data transmitted from the sink device 104 to the source device 102 may be high-quality digital data. Encrypting the audio data prevents the audio data from being copied or altered while the audio data is transmitted from the sink device 104 to the source device 102 over the return data link 114. Specifically, the sink device 104 inserts a first preamble code into a preamble of a sub-frame of the packetized encrypted audio data to indicate that the audio data in a payload of the sub-frame and payloads of subsequent sub-frames is encrypted as well as to indicate that rekeying is to be performed at the source device 102 according to the HDCP protocol, as described below in detail with reference to FIGS. 5A through 5C.

The return data link 114 enables the sink device 104 to transmit data to the source device 102. Specifically, the return data link 114 is used to transmit authentication data associated authenticating the source device 102 by the sink device 104. The return data link 114 is further used to transmit the packetized encrypted audio data from the sink device 104 to the source device 102 (i.e., "upstream"). As described above, the return data link 114 can be an ARC. The data transmitted over the ARC is digital data. The return data link 114 does not transmit audio data from the source device 102 to the sink device 104 (i.e., "downstream").

Encrypting the audio data transmitted from the sink device 104 to the source device 102 using the HDCP protocol in the second mode accompanies the operations of (1) authenticating the source device 102 by the sink device 104 and (2) rekeying to be performed at the source device 102. If the source device 102 does not regularly perform rekeying, the same random values will be eventually repeated. The sink device 104 can regularly insert the first preamble code into a preamble a sub-frame to signal the source device 102 to perform rekeying. In contrast, a second preamble code is inserted or remains in the preamble of the sub-frame when the audio data is not encryption and no rekeying at the source device 102 is requested.

Example Source Device

Figure 2:
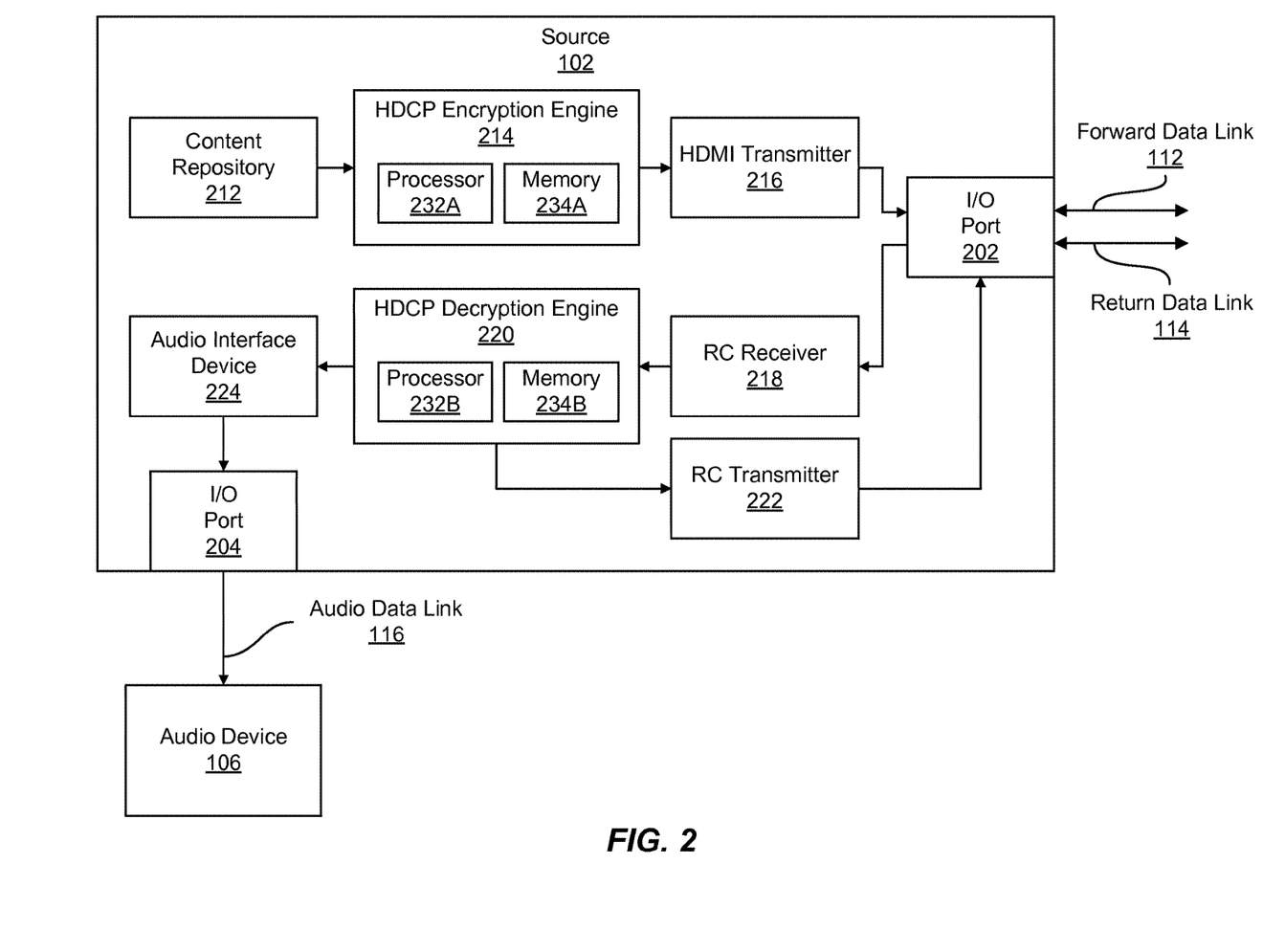
FIG. 2 is a block diagram illustrating a source device, according to one embodiment.

FIG. 2 is a block diagram illustrating the source device 102 for routing a data stream from the sink device 104 to the audio device 106, according to one embodiment. The source device 102 may include, among other components, input/output (I/O) ports 202 and 204, a content repository 212, an HDCP encryption engine 214, a HDMI transmitter 216, a return channel (RC) receiver 218, an HDCP decryption engine 220, a RC transmitter 222, and an audio interface device 224. The source device 102 interfaces with the sink device 104 and the audio device 106 via the I/O ports 202 and 204, respectively. The source device 102 can operate in two modes.

In the first mode, the source device 102 encrypts video data using the HDCP protocol, transmits the encrypted video data to the sink device 104 over the main link of the forward data link 112 and transmits audio data corresponding to the encrypted video data to the audio device 106 over the audio data link 116.

In the first mode, the I/O port 202 transmits first authentication data to the sink device 104 over the side band link of the forward data link 112 and receives second authentication data from the sink device 104 also over the side band link of the forward data link 112. The first and second authentication data are associated with authenticating the sink device 104 by the source device 102. Furthermore, the I/O port 202 transmits a first data stream to the sink device 104 over the main link of the forward data link 112.

In the second mode, the source device 102 receives audio data from the sink device 104 over the return data link 114, and decrypts the encrypted audio data (if encrypted), and transmits the decrypted audio data to the audio device 106 over the audio data link 116.

In the second mode, the I/O port 202 receives third authentication data from the sink device 104 over the return data link 114 and transmits fourth authentication data to the sink device 104 also over the return data link 114. The third and fourth authentication data are associated with authenticating the source device 102 by the sink device 104. Furthermore, the I/O port 202 receives a second data stream from the sink device 104 over the return data link 114. In both the first and second modes, the I/O port 204 transmits a third data stream to the audio device 106 over the audio data link 116.

The content repository 212 stores content including audio data and video data. In some embodiments, the content repository 212 is embodied as an optical disc reader or a hard disk. In other embodiments, the content repository 212 is communicatively coupled with a content source external to the source device 102.

The HDCP encryption engine 214 is a logic block that encrypts and packetizes content received from the content repository 212. The HDCP encryption engine 214 can be implemented using hardware components, computer programs, or combination thereof. The HDCP encryption engine 214 includes a processor 232A and a memory 234A. The memory 232A is a non-transitory computer readable storage medium storing instructions. The processor 232A executes the instructions stored on the memory 234A.

In the first mode, the HDCP encryption engine 214 authenticates the sink device 104 over the side band link of the forward data link 112 via the I/O port 202 and using the HDCP protocol to establish a first secure link between the source device 102 and the sink device 104. In authenticating the sink device 104, the HDCP encryption engine 214 transmits the first authentication data to the sink device 104 over the side band link of the forward data link 112 and receives the second authentication data from the sink device 104 also over the side band link of the forward data link 112. The HDCP encryption engine 214 authenticates the sink device 104 using the first and second authentication data.

In the first mode, the HDCP encryption engine 214 encrypts video data from the content repository 212 using the HDCP protocol, packetizes the encrypted video data, and transmits the packetized encrypted video data to the HDMI transmitter 216.

In the first mode, the HDMI transmitter 216 transmits the first authentication data from the HDCP encryption engine 214 to the sink device 104 over the side band link of the forward data link 112 via the I/O port 202. The HDMI transmitter receives the second authentication data from the sink device 104 over the side band link of the forward data link 112 via the I/O port 202 and transmits the second authentication data to the HDCP encryption engine 214. The HDMI transmitter 216 further transmits the first data stream including the packetized encrypted video data from the HDCP encryption engine 214 to the sink device 104 over the main link of the forward data link 112 via the I/O port 202.

In the second mode, the RC receiver 218 receives the third authentication data from the sink device 104 over the return data link 114 via the I/O port 202. The third authentication data is associated with authenticating the source device 102 by the sink device 104. The RC receiver 218 transmits the third authentication data to the HDCP decryption engine 220. The RC receiver 218 further receives the second data stream including a packetized encrypted audio data stream from the sink device 104 over the return data link 114 via the I/O port 202. The RC receiver 218 transmits the second data stream to the HDCP decryption engine 220. The RC receiver 218 can include a clock data recovery circuit to extract digital data (e.g., the packetized encrypted audio data stream) from the second data stream.

The HDCP decryption engine 220 is a logic block that decrypts a data stream (e.g., the second data stream). The HDCP decryption engine 220 can be implemented using hardware components, computer programs, or a combination thereof. The HDCP decryption engine 220 includes a processor 232B and a memory 234B. The operation and the function of the processor 232B and the memory 234B are the same as those of the processor 232A and the memory 234A of the HDCP encryption engine 214, and therefore, the detailed description thereof is omitted herein for the sake of brevity.

In the second mode, the HDCP decryption engine 220 authenticates with the sink device 104 over the return data link 114 via the I/O port 202 and using the HDCP protocol to establish a second secure link between the sink device 104 and the source device 102. In authenticating with the sink device 104, the HDCP decryption engine 220 receives the third authentication data from the sink device 104 and transmits the fourth authentication to the sink device 104. The HDCP decryption engine 220 authenticates with the sink device 104 using the third and fourth authentication data. The HDCP decryption engine 220 further receives the second data stream including the packetized encrypted audio data stream.

In the second mode, the HDCP decryption engine 220 performs rekeying according to the HDCP protocol if a preamble of a sub-frame of the packetized encrypted audio data stream includes a first preamble code. In the second mode, the HDCP decryption engine 220 decrypts audio data of a payload of the sub-frame and payloads of subsequent sub-frames of the packetized encrypted audio data stream according to the HDCP protocol. The HDCP decryption engine 220 transmits the decrypted audio data stream to the audio device 106.

In the second mode, the RC transmitter 222 receives the fourth authentication data from the HDCP decryption engine 220. The fourth authentication data is associated with authenticating the source device 102 by the sink device 104. The RC transmitter 222 transmits the fourth authentication data to the sink device 104 over the return data link 114 via the I/O port 202. The RC transmitter 222 can include analog circuitry such as a serializer.

The audio interface device 224 receives the decrypted audio data stream from the HDCP decryption engine 220, processes the received audio data stream, and transmits the third data stream including the processed audio data stream to the audio device 106 via the I/O port 204. Processing the audio data stream can include modifying the decrypted audio data stream into a format that can be reproduced by the audio device 106.

The HDCP encryption engine 214 and the HDMI transmitter 216 can be combined into a single component. In one embodiment, the RC receiver 218 and the RC transmitter 222 can be combined into a single component. In one embodiment, the source device 102 can include the audio device 106.

Example Sink Device

Figure 3:
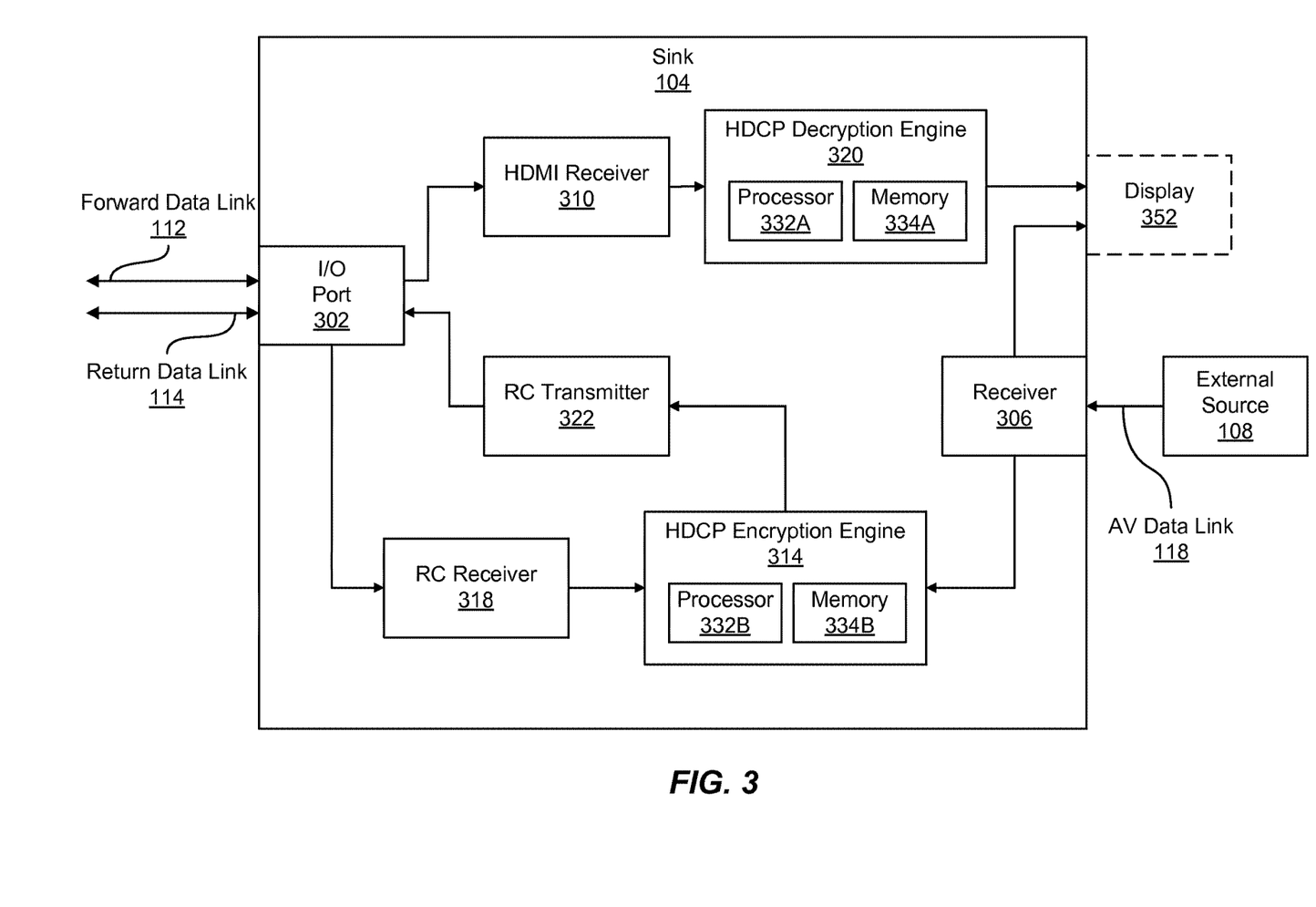
FIG. 3 is a block diagram illustrating a sink device, according to one embodiment.

FIG. 3 is a block diagram illustrating the sink device 104 for routing the second data stream from the sink device 104 to the audio device 106, according to one embodiment. The sink device 104 may include, among other components, an input/output (I/O) port 302, a receiver 306, an HDCP encryption engine 314, RC transmitter 322, RC receiver 318, HDMI receiver 310, and HDCP decryption engine 320.

The sink device 104 can operate in two modes. In a first mode, the sink device 104 receives encrypted video data from the source device 102 over the main link of the forward data link 112, decrypts the encrypted video data, and transmits the decrypted video data to the display 352. In the second mode, the sink device 104 receives data stream including only audio data or audio data and video data, and transmits the audio data stream to the source device 102 over the return data link 114. If the audio data stream over the return data link 114 is to be encrypted, the sink device 104 performs operations associated with encryption and transmits the encrypted audio data stream to the source device 102.

The sink device 104 interfaces with the source device 102 via the I/O port 302. In the first mode, the I/O port 302 receives first authentication data front the source device 102 over the side band link of the forward data link 112 and transmits second authentication data to the source device 102 also over the side band link of the forward data link 112. The first and second authentication data are associated with authenticating the sink device 104 by the source device 102. Furthermore, the I/O port 302 receives the first data stream from the source 102 over the main link of the forward data link 112. In the second mode, the I/O port 302 transmits third authentication data to the source device 102 over the return data link 114 and receives fourth authentication data front the source device 102 also over the return data link 114. The third and fourth authentication data are associated with authenticating the source device 102 by the sink device 104. Furthermore, the I/O port 302 transmits the second data stream to the source device 102 over the return data link 114.

In the second mode, the receiver 306 receives the AV data stream front the external source 108 over the AV data link 118. The AV data stream includes audio data and video data. The receiver 306 transmits a video data stream including the video data to the display 352 and transmits an audio data stream including the audio data to the HDCP encryption engine 314.

The HDCP encryption engine 314 is a logic block that encrypts and packetizes the audio data stream received from the receiver 306. The HDCP encryption engine 314 can be implemented using hardware components, computer programs, or a combination thereof. The HDCP encryption engine 314 includes a processor 332B and a memory 334B. The operation and the function of processor 332B and the memory 334B are to the same as those of the processor 232A and the memory 234A of the HDCP encryption engine 214 of the source device 102, and hence, the detailed description thereof is omitted herein for the sake of brevity.

In the second mode, the HDCP encryption engine 314 authenticates the source device 102 over the return data link 114 via the I/O port 302 and using the HDCP protocol to establish the second secure link between the sink device 104 and the source device 102. In authenticating the source device 102, the HDCP encryption engine 314 transmits the third authentication data to the source device 102 and receives the fourth authentication data from the source device 102. The HDCP encryption engine 314 authenticates the source device 102 using the third and fourth authentication data.

In the second mode, the HDCP encryption engine 314 may encrypt the audio data stream according to the HDCP protocol and packetizes the encrypted audio data stream into sub-frames. The HDCP encryption engine 314 modifies the sub-frames by inserting a first preamble code as a preamble of a sub-frame of the packetized encrypted data to indicate that rekeying is to be performed at the source device 102 according to the HDCP protocol, and to indicate that the audio data in a payload of the sub-frame and payloads of a predetermined number of subsequent sub-frames is encrypted. In one embodiment the predetermined number of subsequent sub-frames is 63, as described below in detail with reference to FIGS. 5A through 5C. The HDCP encryption engine 314 transmits the packetized encrypted audio data stream to the RC transmitter 322.

In one embodiment, the HDCP encryption engine 314 determines whether a portion of the audio data stream is to be encrypted based on an indication from the external source 108. If the portion of the audio data stream is to be encrypted, the HDCP encryption engine 314 encrypts the portion of the audio data stream according to the HDCP protocol and packetizes the encrypted portion of the audio data stream into sub-frames.

In the second mode, the RC transmitter 322 receives the third authentication data from the HDCP encryption engine 314. The third authentication data is associated with authenticating the source device 102 by the sink device 104. The RC transmitter 322 transmits the third authentication data to the source device 102 over the return data link 114 via the I/O port 302. The RC transmitter 322 further transmits the second data stream including the packetized encrypted audio data stream to the source device 102 via the I/O port 302. The RC transmitter 322 can include analog circuitry such as a serializer.

In the second mode, the RC receiver 318 receives the fourth authentication data from the source device 102 over the return data link 114 via the I/O port 302. The fourth authentication data is associated with authenticating the source device 102 by the sink device 104. The RC receiver 318 transmits the fourth authentication data to the HDCP encryption engine 314. The RC receiver 318 can include a clock data recover circuit to extract digital data (e.g., data associated with authenticating) from the data associated with authenticating.

In the first mode, the HDMI receiver 310 receives the first authentication data from the source device 102 and transmits the first authentication data to the HDCP decryption engine 320. The HDMI receiver 310 transmits the second authentication data from the HDCP decryption engine 320 to the source device 102 over the side bank link of the forward data link 112 via the I/O port 302. The HDMI receiver 310 further receives the first data stream including the packetized encrypted video data from the source device 102 over the main link of the forward data link 112 via the I/O port 302 and transmits the first data stream to the HDCP decryption engine 320.

The HDCP decryption engine 320 is a logic block that decrypts a data stream (e.g., the first data stream). The HDCP decryption engine 320 can be implemented using hardware components, computer programs, or combination thereof. The HDCP decryption engine 320 includes a processor 332A and a memory 334A. The operation and the function of the processor 332A and the memory 334A are the same as those of the processor 232A and the memory 234A of the HDCP encryption engine 214, and therefore, the detailed description thereof is omitted herein for the sake of brevity.

In the first mode, the HDCP decryption engine 320 authenticates with the source device 102 over the side band link of the forward data link 112 via the I/O port 302 and using the HDCP protocol to establish the first secure link between the source device 102 and the sink device 104. In authenticating with the source device 102, the HDCP decryption engine 320 receives the first authentication data from the source device 102 and transmits the second authentication data to the source device 102. The HDCP decryption engine 320 authenticates with the source device 102 using the first and second authentication data.

The HDCP decryption engine 320 receives the first data stream including the packetized encrypted video data from the source device 102. The HDCP decryption engine 320 decrypts the packetized encrypted video data using the HDCP protocol and transmits the decrypted video data to the display 352 for display.

In one embodiment, the HDCP decryption engine 320 and the HDMI receiver 310 can be combined into a single component. In one embodiment, the RC transmitter 322 and the RC receiver 318 can be combined into a single component. In some embodiment, the sink device 104 includes a display 352 and in other embodiments, the display 352 is external to the sink device 104.

Example Audio Block Format

Figure 4:
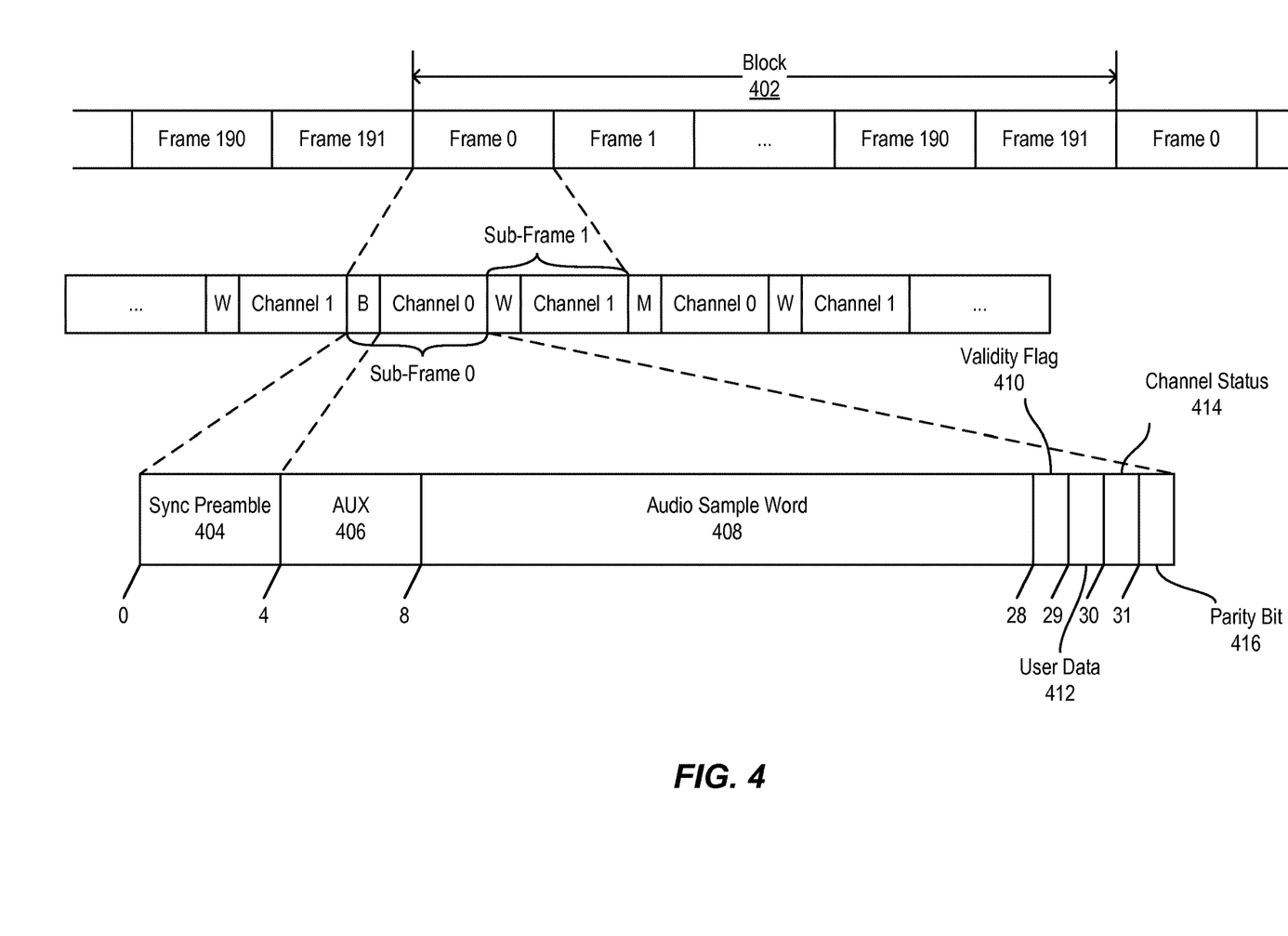
FIG. 4 is a diagram illustrating a data structure of audio data, according to one embodiment.

FIG. 4 is a diagram illustrating a block 402 of audio data compliant with the International Electrotechnical Commission's ("IEC") 60958 standard, second edition (2004), which is incorporated by reference herein in its entirety. The block 402 includes a group of consecutive frames 0 through 191. In other words, the block 402 includes 192 frames. Each frame of the frames 0 through 191 is a sequence of two successive and associated sub-frames 0-1. Each sub-frame (i.e., sub-frame 0, sub-frame 1) includes a sync preamble 404, auxiliary data (AUX) 406, an audio sample word 408, a validity flag 410, user data 412, channel status 414, and a parity bit 416. Each sub-frame includes bits 0 to 31 (32 bits).

Bits 0 through 3 include the sync preamble 404, bits 4 through 7 include the AUX 406, bits 8 through 27 include the audio sample word 408, bit 28 includes the validity flag 410, bit 29 includes the user data 412, bit 30 includes the channel status 414, and bit 31 includes the parity bit 416. Therefore, each frame includes 64 bits and each block 402 includes 12,288 bits. If data is transmitted at 50 megabits per second (Mbps), the block 402 is transmitted in 0.24576 milliseconds (ms).

As specified in the IEC 60958 standard, in a two-channel operation mode, samples taken from two channels, channels 0 and 1, are included in the successive sub-frames 0 and 1.

The sub-frame 0 includes samples from channel 0 and the sub-frame 1 includes samples from channel 1.

The sync preamble 404 of a sub-frame of the sub-frames 0 and 1 provides synchronization and identification information regarding the sub-frame and the block 402. To achieve synchronization within a sampling period and to ensure reliability, the sync preamble 404 intentionally violates biphase mark coding (BMC) rules to distinguish the sync preamble 404 from the remaining data of the sub-frame (e.g., AUX 406, audio sample word 408, validity flag 410, user data 412, channel status 414, and parity bit 416).

The sync preamble 404 of sub-frame 0 of frame 0 of a block (e.g., block 402) includes either a first preamble code, "Bsync," or a second preamble code, "B." The first preamble code "Bsync," indicates rekeying is to be performed at the source device 102 according to the HDCP protocol and that the audio data in a payload of the sub-frame 0 of frame 0 and payloads of subsequent sub-frames (e.g., sub-frames 0 and 1 for frames 0 through 191 of block 402) is encrypted. The first preamble code, "Bsync," further indicates the start of the block 402 and that an audio sample word 408 corresponding to channel 0 is to follow. The sync preamble 404 of sub-frame 0 of frame 0 of the block 402 can include the first preamble code "Bsync" once every 64 blocks. Continuing the previous example, if the block 402 is transmitted in 0.24576 ms, then 64 of the blocks 402 are transmitted in about 15.7 ms. The second preamble code, "B," indicates the start of the block 402 and that an audio sample word 408 corresponding to channel 0 is to follow.

The sync preamble 404 of the sub-frame 0 of the following frames of the block 402 (i.e., frames 1 through 191) includes a third preamble code "M." The third preamble code "M" indicates that an audio sample word 408 of channel 0 is to follow. The sync preamble 404 of sub-frame 1 of all the frames 0 through 191 of the block 402 includes a fourth preamble code, "W." The fourth preamble code, "W," indicates that an audio sample word 408 of channel 1 is to follow.

AUX 406 includes auxiliary information, such as audio data and status information. The audio sample word 408 is a value of a digital audio sample. The audio sample word 408 can be represented using linear two's complement binary form.

The validity bit 410 indicates whether the data bits of the audio sample word 408 are reliable or not. For example, the validity bit 410 is logical '0' if the data bits of the audio sample word 408 are reliable and is logical '1' if it is not. In some embodiments, the validity bit 410 further indicates whether the data bits of the AUX 406 are reliable or not. The user data 412 indicates user information. The channel status 414 indicates information associated with each main data field channel which is decodable by the source device 102. The parity bit 416 provides the detection of an odd number of errors resulting from malfunctions of the interface.

Although embodiments are primarily described herein with reference to the data structure of the IEC 60958 standard, embodiments can be applied to data structure according to other standards.

Figure 5A:
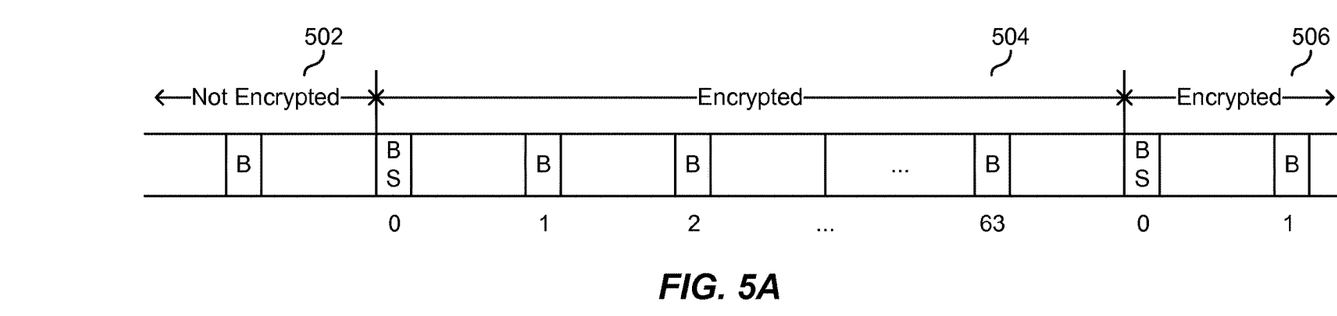
FIGS. 5A through 5C are diagrams illustrating audio data embedded with preamble codes to indicate whether portions of the audio data are encrypted, according to one embodiment.

FIG. 5A illustrates an example structure of data blocks of audio data stream transmitted from the sink device 104 to source device 102, according to one embodiment. As illustrated in FIG. 5A, blocks 502 of the audio data stream that are not encrypted are transmitted followed by blocks 504 of the audio data stream that are encrypted followed by blocks 506 of the audio data stream that are encrypted.

Figure 5B:
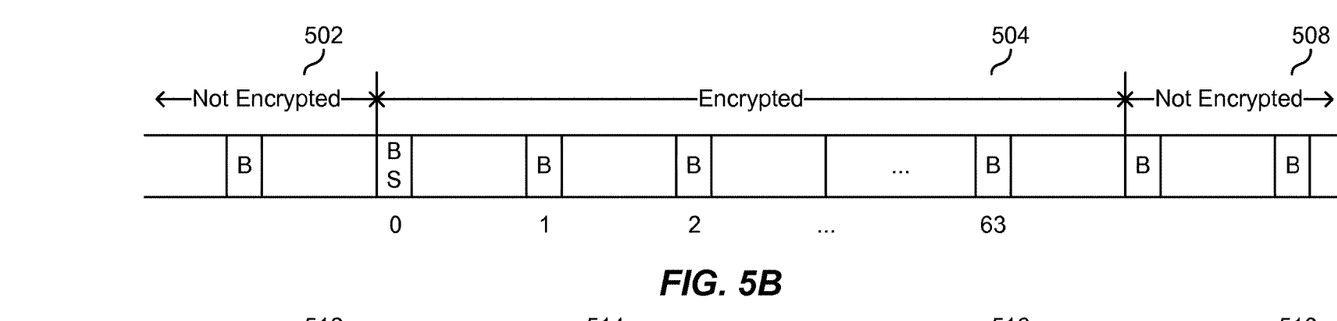

The HDCP encryption engine 314 determines a portion of the audio data stream is not to be encrypted. For example, as illustrated in FIGS. 5A and 5B, the portion can be blocks 502. The HDCP encryption engine 314 does not encrypt the portion of the audio data stream and packetizes the audio data stream into blocks 502. The HDCP encryption engine 314 determines a portion of the audio data stream is to be encrypted. For example, as illustrated in FIGS. 5A and 5B, the portion can be blocks 504. The blocks 504 can include 64 blocks of the audio data stream (i.e. 15.7 ms of the audio data stream). The portion can include fewer or more blocks of the audio data stream in units of 64 blocks. The HDCP encryption engine 314 encrypts the portion of the audio data stream and packetizes the encrypted audio data stream into the blocks 504. The HDCP encryption engine 314 inserts the first preamble code "Bsync" (shown as "BS" in FIG. 5A) as the preamble of the sub-frame 0 of frame 0 of block 0 of the blocks 504. The first preamble code "Bsync," indicates rekeying is to be performed at the source device 102 according to the HDCP protocol and that the following 64 blocks (i.e., the blocks 504) include encrypted data. In one embodiment, the sub-frame 0 of frame 0 of block 0 includes the second preamble code "B." In this embodiment, the HDCP encryption engine 314 replaces the second preamble code "B" of the sub-frame 0 of frame 0 of block 0 with the first preamble code "Bsync." The sub-frame 0 of frame 0 of blocks 1 through 63 of the portion includes the second preamble code "B." After 63 blocks, the HDCP encryption engine 314 determines whether the following portion of the audio data stream is to be encrypted.

In one embodiment, the HDCP encryption engine 314 determines the following portion of the audio data stream is to be encrypted. For example, as illustrated in FIG. 5A, the following portion can be blocks 506. The HDCP encryption engine 314 encrypts the following portion of the audio data stream, packetizes the encrypted following portion of the audio data stream into the blocks 506, and inserts the first preamble code, "Bsync," as the preamble of the sub-frame 0 of frame 0 of block 0 of the blocks 506.

In another embodiment, the HDCP encryption engine 314 determines the following portion of the audio data stream is not to be encrypted. For example, as illustrated in FIG. 5B, the following portion can be blocks 508. In this embodiment, the HDCP encryption engine 314 does not encrypt the following portion of the audio data stream and packetizes the following portion into the blocks 508.

Figure 5C:
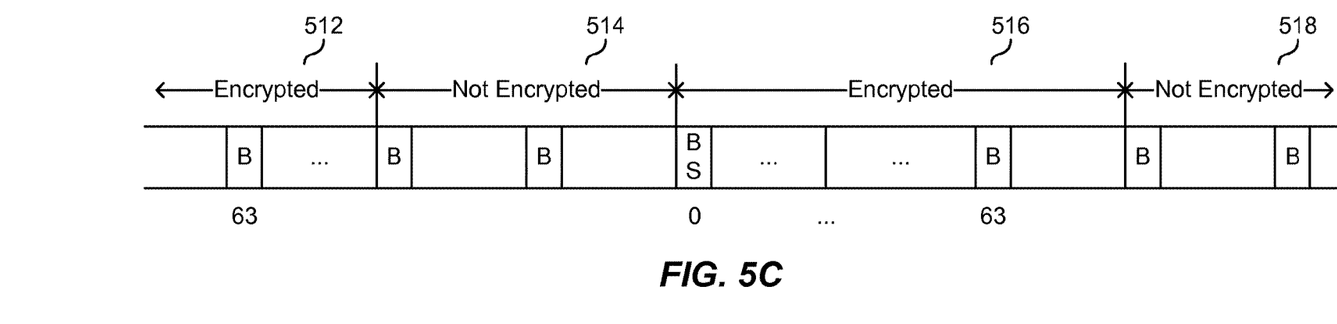

As illustrated in FIG. 5C, the HDCP encryption engine 314 determines a first portion of the audio data stream is to be encrypted, determines a second portion of the audio data stream is not to be encrypted, determines a third portion of the audio data stream is to be encrypted, and determines a fourth portion of the audio data stream is not to be encrypted. The first portion can be blocks 512, the second portion can be blocks 514, the third portion can be blocks 516, and the fourth portion can be blocks 518. In one embodiment, the blocks 512 and 516 are the same as the blocks 504 of FIGS. 5A and 5B, and the blocks 514 and 518 are the same as the blocks 508 of FIG. 5B. As illustrated in FIG. 5C, the blocks 514 includes two blocks. The blocks 514 can include fewer or more blocks of audio data stream. The blocks 518 can also include fewer or more blocks of the audio data stream. Thus, the HDCP encryption engine 314 can determine not to encrypt the second and fourth portions including the blocks 514 and 518, respectively, where the blocks 514 and 518 can include any number of blocks.

Process of Modifying a Data Stream

Figure 6:
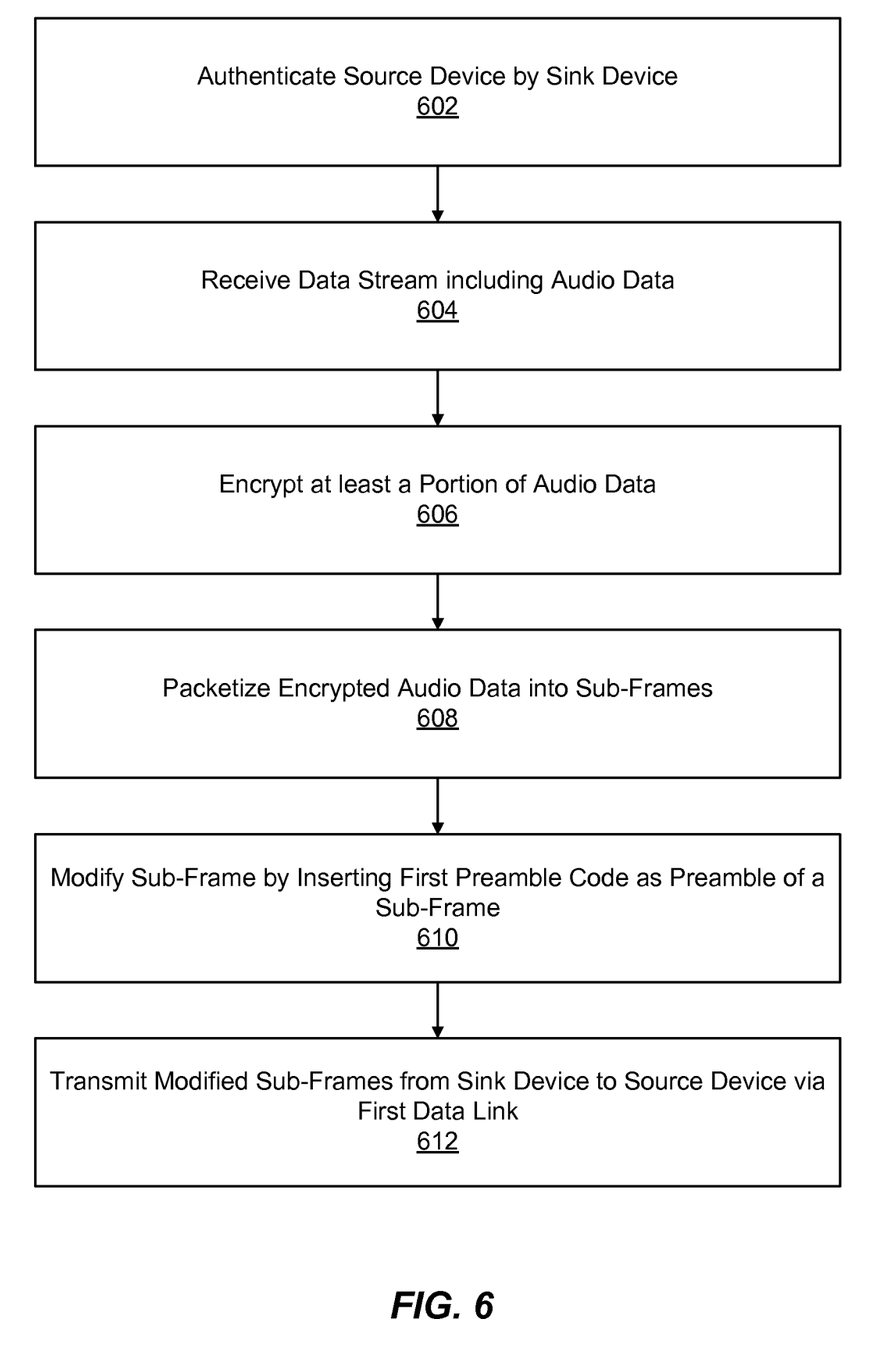
FIG. 6 is a flowchart illustrating a method of modifying a data stream from a sink device to indicate that a sub-frame and its subsequent sub-frames are encrypted, according to one embodiment.

FIG. 6 is a flowchart illustrating a method of modifying a data stream from the sink device 104 to the source device 102, according to one embodiment. The sink device 104 authenticates 602 the source device 102. Specifically, the HDCP encryption engine 314 authenticates 602 the source device 102 over the return data link 114 and using the HDCP protocol.

The receiver 306 receives 604 the AV data stream from the external source 108 over the AV data link 118. The AV data stream includes audio data and video data. The receiver 306 transmits an audio data stream including the audio data to the HDCP encryption engine 314.

The HDCP encryption engine 314 encrypts 606 at least a portion of the audio data stream using to the HDCP protocol. The HDCP encryption engine 314 packetizes 608 the encrypted audio data stream into blocks including sub-frames. For example, the HDCP encryption engine 314 packetizes 608 the audio data stream such that the packetized audio data stream includes units of audio blocks, each audio block including 192 frames, each frame including 2 sub-frames, and each sub-frame including at least a pre-amble and an audio sample word.

The HDCP encryption engine 314 modifies 610 the sub-frames by inserting the first preamble code as a preamble of a sub-frame to indicate rekeying is to be performed at the source device 102 according to the HDCP protocol, and to indicate that at least a portion of the audio data in a payload of the sub-frame and payloads of subsequent sub-frames is encrypted. In one embodiment, modifying 610 the sub-frames by inserting the first preamble code as the preamble of the sub-frame includes replacing a second preamble code of the preamble of the sub-frame with the first preamble code.

The HDCP encryption engine 314 transmits 612 the modified, packetized encrypted audio data stream to the RC transmitter 322 which then transmits 612 the second data stream including the modified, packetized encrypted audio data to the source device 102 over the return data link 114.

The sequence of steps as described above with reference to FIG. 6 is merely illustrative. For example, although receiving 604 the AV data stream including the audio data is described above as occurring after authenticating 602 the source device 102 by the sink device 104, the AV data stream can be received 604 before authenticating 602 the source device 102 by the sink device 104. Similarly, although packetizing 608 the audio data into sub-frames is described above as occurring after encrypting 606 the audio data, the audio data can packetized 608 into sub-frames before encrypting 606 the packetized audio data.

Embodiments may be implemented in circuitry that performs specified functions, inputs, and/or outputs data as described. Such circuitry may be implemented using a programmable processor that is programmed by a sequence of instructions from a medium, such as a non-transitory computer readable medium, by fixed-function logic, by reconfigurable logic, such as field programmable gate array logic, and by a combination thereof. For example, an encryption circuit according to the disclosure may be implemented by one or more of a programmable processor and fixed-function logic that performs, for example, certain portions of an encryption algorithm.

ALTERNATIVE AND ADDITIONAL EMBODIMENTS

Figure 7:
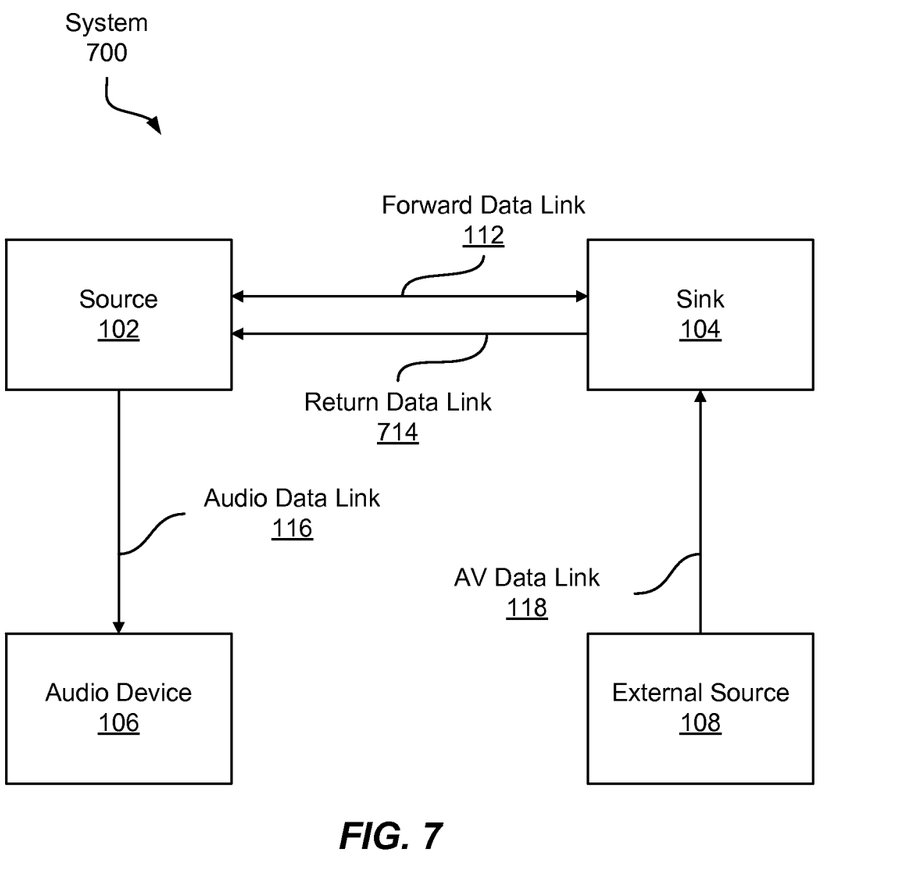
FIG. 7 is a block diagram illustrating a system including a source device, a sink device, an audio device and an external source, according to another embodiment.

FIG. 7 is a block diagram illustrating a system 700 including the source device 102, the sink device 104, the audio device 106, and the external source 108, according to another embodiment. The source device 102 and the sink device 104 are communicatively coupled via the forward data link 112 and a return data link 714. Unlike the bidirectional return data link 114 of FIG. 1, the return data link 714 of FIG. 7 is a unidirectional link. The return data link 714 transmits data from the sink device 104 to the source device 102. In this embodiment, the HDCP encryption engine 314 of the sink device 102 authenticates the source device 102 over the return data link 714 and the side band link of the forward data link 112 via the I/O port 302. In authenticating the source device 102, the HDCP encryption engine 314 transmits the third authentication data to the source device 102 over the return data link 714 and receives the fourth authentication data from the source device 102 over the side band link of the forward data link 112.

Figure 8:
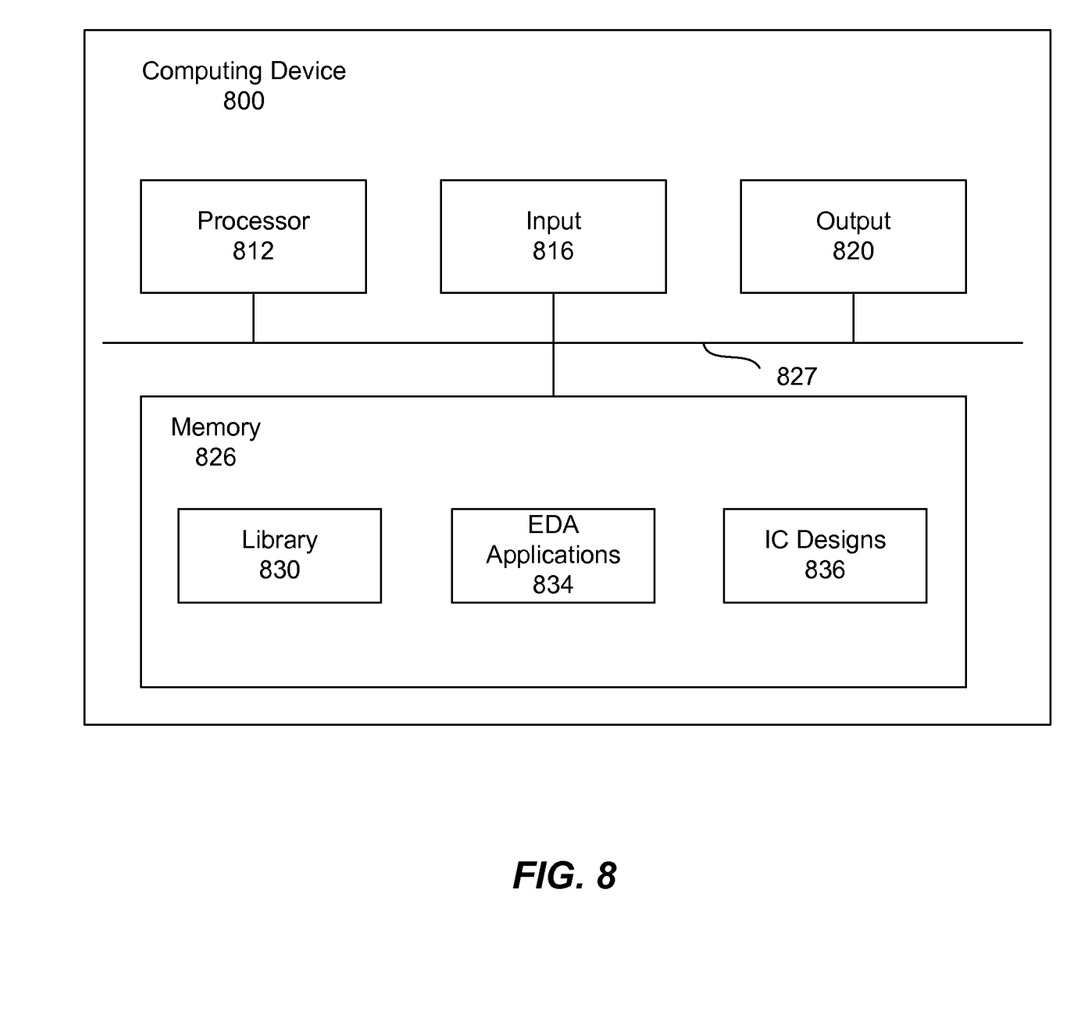
FIG. 8 is a block diagram of a computing device for performing operations associated with the source device and the sink device, according to one embodiment.

FIG. 8 is a block diagram of a computing device 800 for performing designing operations associated with HDCP encryption engines 214, 314 and HDCP decryption engines 220, 320, according to one embodiment. The computer device 800 includes, among other components, a processor 812, an input module 816, an output module 820, a memory 826 and a bus 827 for connecting these components. The processor 812 executes instructions stored in the memory 826. The input module 816 can include various devices for receiving user input, including keyboards and pointing devices (e.g., mouse and touch screen). The output module 820 includes a display device or interface device for communicating with the display device.

The memory 826 is a non-transitory computer readable storage medium storing, among others, library 830, electronic design automation (EDA) applications 834 and integrated circuit (IC) designs 836. The library 830 can include data on various circuit components, including instances of HDCP encryption engines 214, 314 and HDCP decryption engines 220, 320 describe herein. The EDA applications 834 can include various software programs for designing ICs, including place and route tools, synthesis tools, and verification tools. The design processed by the EDA applications 834 may be stored in IC designs 836. The IC designs 836 may be an entire operational circuit or a part of a larger IC circuit. The IC designs 836 include digital representation of one or more of RC receiver 218, HDCP decryption engine 220 and RC transmitter 222 of the source device 102 and HDCP encryption engine 314, RC receiver 318 and RC transmitter 322 of the sink device 104.

Principles described herein may be used in with protocols other than MHL and/or HDCP. For example, similar embodiments can also be used in HDCP in HDMI 2.0.

While particular embodiments and applications of the present disclosure have been illustrated and described, it is to be understood that the embodiments are not limited to the precise construction and components disclosed herein and that various modifications.

What is claimed is:

1. A sink device comprising:
   a receiver configured to receive a data stream including audio data;
   an encryption engine coupled to the receiver, the encryption engine comprising a processor and a memory, the processor configured to:
   authenticate a source device using an authentication and encryption protocol, the source device configured to send video data to the sink device,
   encrypt the received audio data,
   packetize the encrypted audio data into sub-frames, and
   modify the sub-frames by inserting a first preamble code as a preamble of a sub-frame to indicate that rekeying is to be performed at the source device according to the authentication and encryption protocol, the first preamble code further indicating that the audio data in a payload of the sub-frame and payloads of a plurality of subsequent sub-frames is encrypted; and a transmitter coupled to the encryption engine, the transmitter configured to transmit the modified sub-frames to the source device via a first data link.

2. The sink device of claim 1, wherein the audio data comprises a plurality units of audio blocks, each audio block comprising 192 frames, each frame comprising 2 sub-frames, and each sub-frame comprising at least a preamble and an audio sample word.

3. The sink device of claim 2, wherein the preamble includes one of: the first preamble code, a second preamble code indicating a start of an audio block and that an audio sample word corresponding to a first channel is to follow, a third preamble code indicating that an audio sample word corresponding to the first channel is to follow, and a fourth preamble code indicating that an audio sample word corresponding to a second channel is to follow.

4. The sink device of claim 3, wherein the first preamble code further indicates a start of an audio block and that an audio sample word corresponding to the first channel is to follow.

5. The sink device of claim 3, wherein the encryption engine inserts the first preamble code as the preamble of the sub-frame by at least replacing a second preamble code of the preamble of the sub-frame with the first preamble code.

6. The sink device of claim 1, wherein the encryption engine is further configured to determine whether a portion of the audio data is to be encrypted, encrypt the portion of the audio data, and packetize the encrypted portion into sub-frames.

7. The sink device of claim 1, wherein the first data link is an Audio Return Channel (ARC).

8. The sink device of claim 7, wherein the source device is authenticated by the sink device is performed via the first data link.

9. The sink device of claim 1, wherein the source device is authenticated using the first data link and a second data link separate from the first data link.

10. The sink device of claim 9, wherein the second data link is a Display Data Channel (DDC), and the authentication and encryption protocol is High-bandwidth Digital Content Protection (HDCP) protocol.

11. A method comprising:
authenticating a source device by a sink device using an authentication and encryption protocol, the source device configured to send video data to the sink device;
receiving, at the sink device, a data stream including audio data;
encrypting the received audio data;
packetizing the encrypted audio data into sub-frames;
modifying the sub-frames by inserting a first preamble code as a preamble of a sub-frame to indicate that rekeying is to be performed the source device according to the authentication and encryption protocol, and to indicate that the audio data in a payload of the sub-frame and payloads of a plurality of subsequent sub-frames is encrypted; and
transmitting the modified sub-frames from the sink device to the source device via a first data link.

12. The method of claim 11, wherein the audio data comprises a plurality units of audio blocks, each audio block comprising 192 frames, each frame comprising 2 sub-frames, and each sub-frame comprising at least a preamble and an audio sample word.

13. The method of claim 12, wherein the preamble includes one of: the first preamble code, a second preamble code indicating a start of an audio block and that an audio sample word corresponding to a first channel is to follow, a third preamble code indicating that an audio sample word corresponding to the first channel is to follow, and a fourth preamble code indicating that an audio sample word corresponding to a second channel is to follow.

14. The method of claim 13, wherein the first preamble code further indicates a start of an audio block and that an audio sample word corresponding to the first channel is to follow.

15. The method of claim 13, wherein inserting the first preamble code as the preamble of the sub-frame comprises:
replacing a second preamble code of the preamble of the sub-frame with the first preamble code.

16. The method of claim 11, further comprising:
determining whether a portion of the audio data is to be encrypted,
wherein encrypting the received audio data comprises encrypting the portion of the audio data, and
wherein packetizing the encrypted audio data into sub-frames comprises packetizing the encrypted portion into sub-frames.

17. The method of claim 11, wherein the first data link is an Audio Return Channel (ARC).

18. The method of claim 17, wherein authenticating of the source device by the sink device is performed via the first data link.

19. The method of claim 11, wherein authenticating of the source device by the sink device is performed via the first data link and a second data link separate from the first data link.

20. The method of claim 19, wherein the second data link is a Display Data Channel (DDC) and the authentication and encryption protocol is High-bandwidth Digital Content Protection (HDCP) protocol.

21. A non-transitory computer-readable storage medium storing executable computer instructions in a sink device, the instructions when executed by a processor causing the processor to:
authenticate a source device by a sink device using an authentication and encryption protocol, the source device configured to send video data to the sink device;
receive a data stream including audio data;
encrypt the received audio data;
packetize the encrypted audio data into sub-frames;
modify the sub-frames by inserting a first preamble code as a preamble of a sub-frame to indicate that rekeying is to be performed at the source device according to the authentication and encryption protocol, and to indicate that the audio data in a payload of the sub-frame and payloads of a plurality of subsequent sub-frames is encrypted; and
transmit the modified sub-frames to the source device via a first data link.

* * * * *